(12) United States Patent
Qiao et al.

(10) Patent No.: US 11,392,801 B2
(45) Date of Patent: Jul. 19, 2022

(54) ACTION RECOGNITION METHOD AND APPARATUS

(71) Applicant: Huawei Technologies Co., Ltd., Shenzhen (CN)

(72) Inventors: Yu Qiao, Shenzhen (CN); Lei Zhou, Shenzhen (CN); Yali Wang, Shenzhen (CN); Lihui Jiang, Shenzhen (CN); Jianzhuang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 17/034,654

(22) Filed: Sep. 28, 2020

(65) Prior Publication Data
US 2021/0012164 A1    Jan. 14, 2021

Related U.S. Application Data

(63) Continuation of application No. PCT/CN2019/088694, filed on May 28, 2019.

(30) Foreign Application Priority Data

May 29, 2018 (CN) .......................... 201810533284.9

(51) Int. Cl.
*G06K 9/62* (2022.01)
*G06V 10/40* (2022.01)
(Continued)

(52) U.S. Cl.
CPC ......... *G06K 9/6267* (2013.01); *G06K 9/6215* (2013.01); *G06K 9/6217* (2013.01);
(Continued)

(58) Field of Classification Search
CPC ........ G06K 9/00; G06K 9/00523; G06K 9/62; G06K 9/6201; G06K 9/6215;
(Continued)

(56) References Cited

U.S. PATENT DOCUMENTS 8,189,866 B1 * 5/2012 Gu .......................... G06V 40/20
382/103
8,345,984 B2    1/2013 Ji et al.
(Continued)

FOREIGN PATENT DOCUMENTS

CN          103164694 A    6/2013
CN          104408444 A    3/2015
(Continued)

OTHER PUBLICATIONS

Shaukat Abidi, Massimo Piccardi, and Mary-Anne Williams, "Action Recognition in Still Images by Latent Superpixel Classification", arXiv, arXiv:1507.08363v1, Jul. 30, 2015, pp. 1-6 (Year: 2015).*
(Continued)

*Primary Examiner* — Eric Rush
(74) *Attorney, Agent, or Firm* — Conley Rose, P.C.

(57) ABSTRACT

An action recognition method and apparatus related to artificial intelligence and include extracting a spatial feature of a to-be-processed picture, determining a virtual optical flow feature of the to-be-processed picture based on the spatial feature and X spatial features and X optical flow features in a preset feature library, where the X spatial features and the X optical flow features include a one-to-one correspondence, determining a first type of confidence of the to-be-processed picture in different action categories based on similarities between the virtual optical flow feature and Y optical flow features, where each of the Y optical flow features in the preset feature library corresponds to one action category, X and Y are both integers greater than 1, and determining an action category of the to-be-processed picture based on the first type of confidence.

20 Claims, 9 Drawing Sheets

(51) Int. Cl.
*G06V 20/40* (2022.01)
*G06V 10/62* (2022.01)
*G06V 10/72* (2022.01)
*G06V 10/77* (2022.01)
*G06V 10/74* (2022.01)

(52) U.S. Cl.
CPC .......... *G06K 9/6232* (2013.01); *G06V 10/40* (2022.01); *G06V 10/62* (2022.01); *G06V 10/72* (2022.01); *G06V 10/761* (2022.01); *G06V 10/7715* (2022.01); *G06V 20/41* (2022.01); *G06V 20/46* (2022.01)

(58) Field of Classification Search
CPC .. G06K 9/6217; G06K 9/6232; G06K 9/6267; G06V 10/40; G06V 10/62; G06V 10/70; G06V 10/72; G06V 10/74; G06V 10/761; G06V 10/764; G06V 10/765; G06V 10/77; G06V 10/771; G06V 10/7715; G06V 10/772; G06V 10/778; G06V 10/82; G06V 20/40; G06V 20/41; G06V 20/42; G06V 20/44; G06V 20/46; G06V 20/52; G06V 20/597; G06V 20/70; G06V 40/20; G06V 40/23; G06V 40/28; G06T 7/20; G06T 7/246; G06T 7/248; G06T 2207/20081; G06T 2207/20084; G06T 2207/30196; G08B 13/19608; G08B 13/19613; G08B 13/19615; H04N 21/23418
USPC ....... 382/100, 107, 155, 159, 160, 181, 190, 382/209, 217–220, 224; 348/143, 154, 348/155, 157, 169, 700; 707/728
See application file for complete search history.

(56) References Cited

U.S. PATENT DOCUMENTS

| | | | |
|---|---|---|---|
| 8,774,499 B2* | 7/2014 | Wang | G06V 20/49 382/159 |
| 9,436,890 B2* | 9/2016 | Kim | G06V 10/44 |
| 2015/0325046 A1* | 11/2015 | Meier | G06K 9/6255 382/154 |

FOREIGN PATENT DOCUMENTS

| | | |
|---|---|---|
| CN | 104899554 A | 9/2015 |
| CN | 105069413 A | 11/2015 |
| CN | 105160310 A | 12/2015 |
| CN | 105303571 A | 2/2016 |
| CN | 105551182 A | 5/2016 |
| CN | 106570480 A | 4/2017 |
| CN | 106846367 A | 6/2017 |
| CN | 106933340 A | 7/2017 |
| CN | 107169415 A | 9/2017 |
| CN | 107194419 A | 9/2017 |
| CN | 107463949 A | 12/2017 |
| CN | 107609460 A | 1/2018 |
| CN | 107644519 A | 1/2018 |
| CN | 107862376 A | 3/2018 |
| CN | 107967441 A | 4/2018 |

OTHER PUBLICATIONS

Ruohan Gao, Bo Xiong, and Kristen Grauman, "Im2Flow: Motion Hallucination from Static Images for Action Recognition", arXiv, arXiv: 1712.04109v2, May 28, 2018, pp. 1-13 (Year: 2018).*

Cheron, G., et al., "P-CNN: Pose-based CNN Features for Action Recognition," International Conference on Computer Vision, 2015, pp. 3218-3226.

Gkioxari, G., et al., "Actions and Attributes from Wholes and Parts," ICCV, 2015, pp. 2470-2478.

Gkioxari, G., et al., "Contextual Action Recognition with R*CNN," ICCV, 2015, pp. 1080-1088.

Qingwei, Q., et al. "Human Action Recognition Via Dual Spatio-temporal Network Flow and Attention Mechanism Fusion," Nanjing University of Posts and Telecommunications, Feb. 2018, 76 pages. With English abstract.

Xiangzi, A., et al., "Simple action recognition based on sequence alignment," 2007, with English abstract.

Wang, L., et al., "Temporal Segment Networks: Towards Good Practices for Deep Action Recognition," arXiv:1608.00859v1 [cs.CV], Aug. 2, 2016, 17 pages.

Simonyan, K., et al. "Two-Stream Convolutional Networks for Action Recognition in Videos," CoRR, 2014, 9 pages.

Marjaneh Safaei et al., Single Image Action Recognition by Predicting Space-Time Saliency. arXiv:1705.04641v1 [cs.CV] May 12, 2017, 9 pages.

* cited by examiner

ACTION RECOGNITION METHOD AND APPARATUS

CROSS-REFERENCE TO RELATED APPLICATIONS

This application is a continuation of International Patent Application No. PCT/CN2019/088694 filed on May 28, 2019, which claims priority to Chinese Patent Application No. 201810533284.9 filed on May 29, 2018. The disclosures of the aforementioned applications are hereby incorporated by reference in their entireties.

TECHNICAL FIELD

This application relates to the field of action recognition technologies, and in particular, to an action recognition method and apparatus.

BACKGROUND

Action recognition includes action recognition on a person in a video and action recognition on a person in a picture. Because the video includes a relatively large amount of information, it is relatively easy to recognize an action of the person in the video. Compared with the video, the picture includes less information. Therefore, how to effectively recognize an action category of the person in the picture is a problem that needs to be resolved.

SUMMARY

This application provides an action recognition method and apparatus, to improve action recognition accuracy.

According to a first aspect, an action recognition method is provided. The method includes obtaining a to-be-processed picture, determining a spatial feature of the to-be-processed picture, determining a virtual optical flow feature of the to-be-processed picture based on the spatial feature of the to-be-processed picture, and the X spatial features and the X optical flow features in a feature library, determining, based on similarities between the virtual optical flow feature of the to-be-processed picture and Y optical flow features in the feature library, a first type of confidence of the to-be-processed picture in different action categories, and determining an action category of the to-be-processed picture based on the first type of confidence.

It should be understood that the feature library is a preset feature library, and the feature library includes a plurality of spatial features and a plurality of optical flow features. Each spatial feature in the feature library corresponds to one action category, and each optical flow feature in the feature library corresponds to one action category. Herein, both X and Y are integers greater than 1.

Optionally, an action category corresponding to each spatial feature and an action category corresponding to each optical flow feature are obtained through pretraining based on a convolutional neural network (CNN) model.

Optionally, a plurality of spatial features and a plurality of optical flow features in the feature library are in a one-to-one correspondence. Each spatial feature in the feature library corresponds to one optical flow feature, and each optical flow feature in the feature library corresponds to one spatial feature.

In this application, the virtual optical flow feature of the to-be-processed picture can be obtained using the spatial feature of the to-be-processed picture and the spatial feature and the optical flow feature in the feature library, to simulate, for the picture, time sequence information closely related to an action. Then, action recognition may be performed on the to-be-processed picture based on a similarity between the virtual optical flow feature of the to-be-processed picture and the optical flow feature in the feature library.

In addition, in this application, action recognition is directly performed by comparing the virtual optical flow feature of the to-be-processed picture with the optical flow feature in the feature library, without establishing a training model to perform action recognition on the to-be-processed picture. Therefore, action recognition on the to-be-processed picture can be implemented using a relatively small quantity of optical flow features.

Optionally, the X spatial features and the X optical flow features are respectively all spatial features and all optical flow features in the feature library.

The virtual optical flow feature of the to-be-processed picture is determined based on the spatial feature of the to-be-processed picture, and all the spatial features and all the optical flow features in the feature library such that the virtual optical flow feature of the to-be-processed picture can be determined more accurately, and an action category of the to-be-processed picture can be determined more accurately.

Optionally, the X spatial features and the X optical flow features are respectively some spatial features and some optical flow features in the feature library.

The virtual optical flow feature of the to-be-processed picture is determined in combination with the some spatial features and the some optical flow features in the feature library and the spatial feature of the to-be-processed picture such that a calculation amount of the virtual optical flow feature of the to-be-processed picture can be reduced, thereby improving a speed of performing action recognition on the to-be-processed picture.

Optionally, the X spatial features and the X optical flow features are in a one-to-one correspondence. In the X spatial features and the X optical flow features, each spatial feature corresponds to one optical flow feature, and each optical flow feature corresponds to one spatial feature.

It should be understood that the Y optical flow features may be all or some optical flow features in the feature library. In addition, X and Y may be the same or may be different.

When the Y optical flow features are all the optical flow features in the feature library, the action category of the to-be-processed picture is obtained based on similarities between the virtual optical flow feature of the to-be-processed picture and all the optical flow features in the feature library. In this way, accuracy of the first type of confidence can be improved, to further improve an effect of performing action recognition on the to-be-processed picture.

When the Y optical flow features are some optical flow features in the feature library, a calculation amount of determining the first type of confidence can be reduced, thereby improving a speed of performing action recognition on the to-be-processed picture.

Optionally, the to-be-processed picture is a picture including a person, and determining an action category of the to-be-processed picture based on the first type of confidence includes determining an action category of the person in the to-be-processed picture based on the first type of confidence.

That is, in this application, determining the action category of the to-be-processed picture is actually determining an action category of the person or another target object in the to-be-processed picture.

Optionally, the to-be-processed picture is a static picture.

Optionally, the spatial feature is a spatial feature vector, and the optical flow feature is an optical flow feature vector.

In some implementations, determining a virtual optical flow feature of the to-be-processed picture based on the spatial feature of the to-be-processed picture, and the X spatial features and the X optical flow features in a feature library includes performing weighted summation on the X optical flow features based on a similarity between the spatial feature of the to-be-processed picture and each of the X spatial features in the feature library, to obtain the virtual optical flow feature of the to-be-processed picture.

In some implementations, the feature library includes a spatial feature and an optical flow feature of a training video.

In this application, the virtual optical flow feature of the to-be-processed picture may be determined based on the spatial feature and the optical flow feature of the training video and the spatial feature of the to-be-processed picture, and the action category of the to-be-processed picture is further determined based on the virtual optical flow feature.

In some implementations, the feature library further includes a spatial feature and a virtual optical flow feature of a training picture.

In this application, the virtual optical flow feature of the to-be-processed picture may be comprehensively determined based on the spatial feature and the optical flow feature of the training video, the spatial feature and the optical flow feature of the training picture, and the spatial feature of the to-be-processed picture such that a more accurate virtual optical flow feature can be obtained, and action recognition accuracy can be further improved.

Optionally, an action category of the training picture is not exactly the same as an action category of the training video.

Because the action category of the training video is not completely the same as the action category of the training picture, a class of a recognizable action category can be increased, thereby improving an applicable scope of action recognition.

Optionally, different action categories of the training video correspond to a same quantity of videos.

When different categories of the training video correspond to a same quantity of videos, it can be ensured that the number of training videos corresponding to different action categories could be balanced, and stability of an action recognition result is ensured.

Optionally, the method further includes selecting, from a preset picture library, a picture that matches an action category that needs to be recognized, to obtain the training picture.

The foregoing picture library may be a local picture database, or may be a picture database located in a network server.

Optionally, the method further includes selecting, from a preset video library, a video whose similarity with the spatial feature of the training picture meets a preset requirement, to obtain the training video.

The video library may be a local video library, or may be a video library in the network server.

Selecting, from a preset video library, a video whose similarity with the spatial feature of the training picture meets a preset requirement, to obtain the training video includes selecting, from the preset video library, a video whose similarity with the spatial feature of the training picture is greater than a preset similarity threshold, to obtain the training video.

For example, all videos whose similarity with the spatial feature of the training picture is greater than 0.5 in the preset video library may be selected, to form the training video.

Optionally, selecting, from a preset video library, a video whose similarity with the spatial feature of the training picture meets a preset requirement, to obtain the training video includes determining a similarity between a spatial feature of a video in the video library and the spatial feature of the training picture, and selecting first J videos in the video library that have a maximum similarity with the spatial feature of the training picture, to obtain the training video, where J is less than K, both J and K are integers greater than 0, and K is a total quantity of videos in the video library.

For example, the video library includes 100 videos in total. In this case, first 50 videos in the video library that have a maximum similarity with the spatial feature of the training picture may be selected to form the training video.

In some implementations, determining a virtual optical flow feature of the to-be-processed picture based on the spatial feature of the to-be-processed picture, and the X spatial features and the X optical flow features in a feature library includes determining, based on a similarity between the spatial feature of the to-be-processed picture and each of the X spatial features, a weight coefficient of an optical flow feature that corresponds to each of the X spatial features and that is in the feature library, and performing weighted summation on the X optical flow features based on the weight coefficient of each of the X optical flow features, to obtain the virtual optical flow feature of the to-be-processed picture.

It should be understood that a spatial feature and an optical flow feature that correspond to each other in the feature library correspond to a same video or picture. In other words, the spatial feature and the optical flow feature that correspond to each other in the feature library belong to a same video or a same picture.

In some implementations, a value of the weight coefficient of each of the X optical flow features and a first similarity have a positive correlation. The first similarity is a similarity between the spatial feature of the to-be-processed picture and a spatial feature in the X spatial features that corresponds to each of the X optical flow features.

For example, the X spatial features include a first spatial feature, the X optical flow features include a first optical flow feature, there is a correspondence between the first spatial feature and the first optical flow feature, and a similarity between the first spatial feature and the spatial feature of the to-be-processed picture is a similarity 1. In this case, a value of a weight coefficient of the first optical flow feature and the similarity 1 have a positive correlation (which may be a direct proportion relationship).

The weight coefficient of the optical flow feature is properly set such that the virtual optical flow feature that is of the to-be-processed picture and that is obtained based on the optical flow feature in the feature library is more accurate.

Optionally, the feature library includes the spatial feature and the optical flow feature of the training video, and determining a virtual optical flow feature of the to-be-processed picture based on the spatial feature of the to-be-processed picture and spatial features and optical flow features in a feature library includes determining, based on a similarity between the spatial feature of the to-be-processed picture and each spatial feature of the training video, a weight coefficient of an optical flow feature corresponding to each spatial feature of the training video, and performing weighted summation on the optical flow feature in the feature library based on the weight coefficient of each optical flow feature of the training video, to obtain the virtual optical flow feature of the to-be-processed picture.

It should be understood that the training video has both a plurality of spatial features and a plurality of optical flow features.

In this application, the virtual optical flow feature of the to-be-processed picture is determined based on only the spatial feature and the optical flow feature of the training video such that complexity of determining the virtual optical flow feature can be reduced.

Optionally, the feature library includes the spatial feature and the optical flow feature of the training video and the spatial feature and the virtual optical flow feature of the training picture, and determining a virtual optical flow feature of the to-be-processed picture based on the spatial feature of the to-be-processed picture and spatial features and optical flow features in a feature library includes determining, based on a similarity between the spatial feature of the to-be-processed picture and each spatial feature of the training video and the training picture, a weight coefficient of an optical flow feature corresponding to each spatial feature of the training video and the training picture, and performing weighted summation on the optical flow feature of the training video and the training picture based on the weight coefficient of each optical flow feature of the training video and the training picture, to obtain the virtual optical flow feature of the to-be-processed picture.

It should be understood that the training picture has both a plurality of spatial features and a plurality of optical flow features.

In this application, the virtual optical flow feature of the to-be-processed picture is comprehensively determined using the spatial feature and the optical flow feature of the training video and the spatial feature and the virtual optical flow feature of the training picture such that the obtained virtual optical flow feature of the to-be-processed picture can better reflect motion information of the to-be-processed picture.

In some implementations, the virtual optical flow feature of the training picture is obtained by performing weighted summation on the optical flow feature of the training video based on a similarity between the spatial feature of the training picture and the spatial feature of the training video.

In some implementations, the method further includes performing weighted summation on the optical flow feature of the training video based on the similarity between the spatial feature of the training picture and the spatial feature of the training video, to obtain the virtual optical flow feature of the training picture.

Optionally, performing weighted summation on the optical flow feature of the training video based on the similarity between the spatial feature of the training picture and the spatial feature of the training video, to obtain the virtual optical flow feature of the training picture includes determining, based on the similarity between the spatial feature of the to-be-processed picture and each spatial feature of the training video, a weight coefficient of an optical flow feature that is of the training video and that corresponds to each spatial feature, and performing weighted summation on the optical flow feature of the training video based on the weight coefficient of each optical flow feature of the training video, to obtain the virtual optical flow feature of the to-be-processed picture.

It should be understood that the feature library may initially include only the spatial feature and the optical flow feature of the training video. To further improve final action recognition accuracy, the spatial feature and the virtual optical flow feature of the training picture may be further added to the feature library, and the virtual optical flow feature of the training picture may be determined based on the spatial feature and the optical flow feature that are of the training video and that are included in the feature library.

Therefore, in this application, the virtual optical flow feature of the training picture is determined using the spatial feature and the optical flow feature of the training video, and the spatial feature and the virtual optical flow feature of the training picture are added the feature library such that an action recognition effect can be improved to a specific extent.

In some implementations, the method further includes determining a second type of confidence of the to-be-processed picture in the different action categories based on similarities between the spatial feature of the to-be-processed picture and Z spatial features in a preset feature library, where each spatial feature of the Z spatial features corresponds to one action category, and determining an action category of the to-be-processed picture based on the first type of confidence includes determining the action category of the to-be-processed picture based on the first type of confidence and the second type of confidence.

It should be understood that the first type of confidence is obtained using an optical flow prediction process, and the second type of confidence is obtained using a spatial prediction process. Z is an integer greater than 1. Any two values of X, Y, and Z may be the same or may be different. In addition, the Z spatial features may be all or some spatial features in the feature library.

In this application, confidence of the to-be-processed picture is comprehensively obtained through optical flow prediction and spatial prediction such that the action category of the to-be-processed picture can be determined more accurately.

In some implementations, determining the action category of the to-be-processed picture based on the first type of confidence and the second type of confidence includes performing weighted summation on the first type of confidence and the second type of confidence, to obtain final confidence of the to-be-processed picture in the different action categories, and determining the action category of the to-be-processed picture based on the final confidence.

Weighted summation is performed on the first type of confidence and the second type of confidence such that confidence of the to-be-processed picture in the different action categories can be comprehensively obtained, and an action category of the to-be-processed picture can be better determined.

In some implementations, after determining an action category of the to-be-processed picture, the method further includes adding the spatial feature and the virtual optical flow feature of the to-be-processed picture and action category information in the to-be-processed picture to the feature library.

The spatial feature and the virtual optical flow feature of the to-be-processed picture and the corresponding action category information are added to the feature library such that quantities of the spatial features and the optical flow features that are included in the feature library can be increased, to better perform action recognition on the picture based on the spatial feature and the optical flow feature in the feature library subsequently.

According to a second aspect, an action recognition apparatus is provided. The action recognition apparatus includes a module configured to perform the method in the first aspect.

According to a third aspect, an action recognition apparatus is provided. The action recognition apparatus includes a memory and a processor. The memory is configured to store a program, the processor is configured to execute the program stored in the memory, and when executing the program stored in the memory, the processor is configured to perform the method in the first aspect.

According to a fourth aspect, a computer readable medium is provided. The computer readable medium stores program code to be executed by a device, and the program code includes an instruction used to perform the method in the first aspect.

According to a fifth aspect, a computer program product including an instruction is provided. When the computer program product runs on a computer, the computer is enabled to perform the method in the first aspect.

According to a sixth aspect, an electronic device is provided. The electronic device includes the action recognition apparatus in the second aspect or the third aspect.

DESCRIPTION OF EMBODIMENTS

Figure 1:
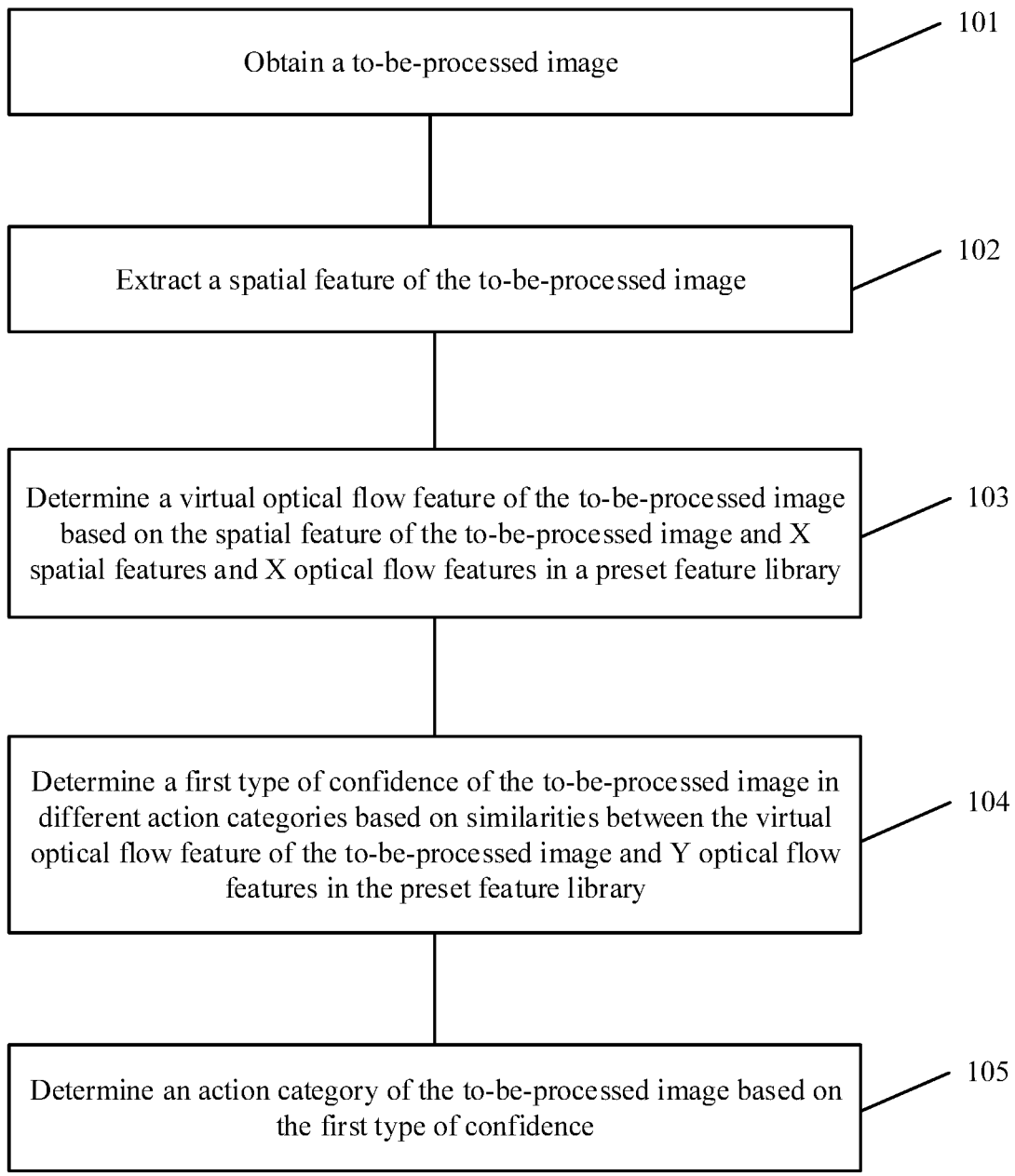
FIG. 1 is a schematic flowchart of an action recognition method according to an embodiment of this application.

The following describes technical solutions in this application with reference to accompanying drawings.

An action recognition method in embodiments of this application can be applied to picture retrieval, album management, safe city, man-machine interaction, and a scenario in which action recognition needs to be performed. The action recognition method in the embodiments of this application can be applied to an album management system and a picture search system. The following briefly describes the album management system and the picture search system separately.

Album Management System:

When a user stores a large quantity of pictures in a mobile phone or a cloud disk, to conveniently search for different classes of pictures, the user may classify pictures in an album. For example, action recognition may be performed on the picture in the album using the action recognition method in the embodiments of this application, to obtain an action category of each picture such that the user can classify and manage different action categories of pictures, thereby helping the user search for a picture, reducing management time, and improving album management efficiency.

Picture Search System:

There are massive pictures on the Internet. Currently, a picture is searched for mainly based on a text of a web page on which the picture is located, but the text of the web page on which the picture is located cannot completely reflect a feature of the picture. According to the action recognition method in the embodiments of this application, an action type in the picture can be recognized such that a picture of interest can be found from the Internet or a database based on the action type in the picture.

To implement action recognition on the picture, in a conventional solution, a person image is extracted from a large quantity of training pictures, and then a CNN model is trained based on the person image extracted from the training pictures and an action category corresponding to the person image, to obtain each parameter of the CNN model. When action recognition needs to be performed on a person in a to-be-processed picture, a person image may be extracted from the to-be-processed picture, and the person image extracted from the to-be-processed picture is input into the trained CNN model for action recognition, to determine an action category of the to-be-processed picture. In the conventional solution, only a spatial feature of the picture is considered during action recognition, and a time attribute of an action of the person in the to-be-processed picture is not further explored. Consequently, action recognition accuracy is still relatively low.

Therefore, this application provides a new action recognition method. An optical flow feature of the to-be-processed picture is simulated using a known optical flow feature, to obtain a virtual optical flow feature of the to-be-processed picture. Then, an action in the to-be-processed picture is recognized based on the virtual optical flow feature of the to-be-processed picture.

The action recognition method in the embodiments of this application is described below in detail with reference to FIG. 1. A method shown in FIG. 1 may be performed by an action recognition apparatus. The action recognition apparatus may be a device having a picture processing function, for example, a monitoring device, a terminal device, a network server, or a network cloud platform. The method shown in FIG. 1 includes step 101 to step 105. The following separately describes step 101 to step 105 in detail.

101. Obtain a to-be-processed picture.

The to-be-processed picture (or a to-be-processed image) may be a picture including a person. Performing action recognition on the to-be-processed picture is essentially recognizing an action of a person in the to-be-processed picture, and determining an action category of the to-be-processed picture.

The to-be-processed picture may be a photo taken using an electronic device, or may be a picture captured from a video. The to-be-processed picture may be stored in a local picture database, or may be stored in a network.

The to-be-processed picture may be directly retrieved from the local picture database, or may be obtained online from the network.

In this application, the action category may be an action performed by the person in the to-be-processed picture. For example, the action category may include running, walking, baseball pitching, baseball swinging, bowling, clean and jerk, golf swinging, jumping a rope, a pull-up, a push-up, sitting up, a squat, strumming a guitar, swimming, and the like.

It should be understood that the foregoing examples are merely some specific examples of action types (which are mainly action categories in a sports aspect). Actually, action types included in this embodiment of this application are not limited thereto. The action categories in this application may further include an action other than sports, for example, watching a mobile phone, and a posture of a person in a man-machine interaction system. In addition, the action category may also be an action class, an action type, or the like.

102. Extract a spatial feature of the to-be-processed picture.

When the spatial feature of the to-be-processed picture is being determined, a convolution operation may be performed on the to-be-processed picture using a CNN model (the CNN model may be a pre-trained model), to obtain the spatial feature of the to-be-processed picture.

103. Determine a virtual optical flow feature of the to-be-processed picture based on the spatial feature of the to-be-processed picture and X spatial features and Y optical flow features in a preset feature library.

Herein, both X and Y are integers greater than 1.

It should be understood that the feature library may be a preset feature library. The feature library includes a plurality of spatial features and a plurality of optical flow features, each of the plurality of spatial features corresponds to one action category, and each of the plurality of optical flow features also corresponds to one action category. An action category corresponding to each spatial feature and an action category corresponding to each optical flow feature may be obtained through pre-training based on the CNN model.

In addition, there is a one-to-one correspondence between the plurality of spatial features and the plurality of optical flow features in the feature library, any one of the plurality of spatial features corresponds to one of the plurality of optical flow features, and any one of the plurality of optical flow features corresponds to one of the plurality of spatial features. A quantity of spatial features and a quantity of optical flow features are usually the same in the feature library.

The X spatial features and the X optical flow features may also be in a one-to-one correspondence. That is, in the X spatial features and the X optical flow features, each spatial feature corresponds to one optical flow feature, and each optical flow feature corresponds to one spatial feature.

The X spatial features may be all or some spatial features in the feature library.

The X optical flow features may be all or some optical flow features in the feature library.

When the X spatial features and the X optical flow features are respectively all the spatial features and all the optical flow features in the feature library, the virtual optical flow feature of the to-be-processed picture can be determined based on the spatial feature of the to-be-processed picture, and all the spatial features and all the optical flow features in the feature library. In this way, the virtual optical flow feature of the to-be-processed picture can be determined more accurately, to further determine the action category of the to-be-processed picture more accurately.

When the X spatial features and the X optical flow features are respectively some spatial features and some optical flow features in the feature library, the virtual optical flow feature of the to-be-processed picture is determined in combination with the some spatial features and the some optical flow features in the feature library and the spatial features of the to-be-processed picture. In this way, a calculation amount of calculating the virtual optical flow feature of the to-be-processed picture can be reduced, thereby improving a speed of performing action recognition on the to-be-processed picture.

In addition, a spatial feature and an optical flow feature that have a correspondence in the feature library correspond to a same video or picture. In other words, the spatial feature and the optical flow feature that have a correspondence in the feature library belong to a same video or a same picture. In addition, a specific representation form of the spatial feature mentioned in this application may be a spatial feature vector, and a specific representation form of the optical flow feature or the virtual optical flow feature may be an optical flow feature vector or a virtual optical flow feature vector.

Each spatial feature in the feature library corresponds to one optical flow feature (the spatial feature and the optical flow feature are in a one-to-one correspondence in the feature library). Therefore, when the virtual optical flow feature of the to-be-processed picture is being determined based on the spatial feature of the to-be-processed picture and the spatial feature and the optical flow feature in the preset feature library, weighted summation may be performed, based on a similarity between the spatial feature of the to-be-processed picture and the spatial feature in the feature library, on the optical flow feature that is in the feature library and that corresponds to the spatial feature in the feature library, to obtain the virtual optical flow feature of the to-be-processed picture.

Therefore, determining a virtual optical flow feature of the to-be-processed picture based on the spatial feature of the to-be-processed picture and X spatial features and X optical flow features in a preset feature library in step 103 includes the following specific process.

(1) Determine a weight coefficient (or a weighting coefficient) of each of the X optical flow features based on a similarity between the spatial feature of the to-be-processed picture and each of the X spatial features.

(2) Perform weighted summation on the X optical flow features based on the weight coefficient of each of the X optical flow features, to obtain the virtual optical flow feature of the to-be-processed picture.

Optionally, a value of the weight coefficient of each of the X optical flow features and a first similarity have a positive correlation. The first similarity is a similarity between the spatial feature of the to-be-processed picture and a spatial feature in the X spatial features that corresponds to each of the X optical flow features.

For example, the X spatial features include a first spatial feature and a second spatial feature, the Y optical flow features include a first optical flow feature and a second optical flow feature, the first spatial feature corresponds to the first optical flow feature, the second spatial feature corresponds to the second optical flow feature, a similarity between the spatial feature of the to-be-processed picture and the first spatial feature is a similarity 1, a similarity between the spatial feature of the to-be-processed picture and the second spatial feature is a similarity 2, and the similarity 1 is greater than the similarity 2. Then, when weighted summation is performed on the first optical flow feature, the second optical flow feature, and another optical flow feature in the X optical flow features, a weight coefficient of the first optical flow feature is greater than a weight coefficient of the second optical flow feature.

In this application, the weight coefficient of the optical flow feature is properly set such that the virtual optical flow feature that is of the to-be-processed picture and that is obtained based on the optical flow feature in the feature library is more accurate.

104. Determine a first type of confidence of the to-be-processed picture in different action categories based on similarities between the virtual optical flow feature of the to-be-processed picture and Y optical flow features in the feature library.

Each of the Y optical flow features corresponds to one action category, and Y is an integer greater than 1.

It should be understood that the Y optical flow features may be all or some optical flow features in the feature library. In addition, Y and X may be the same or may be different.

When the Y optical flow features are all the optical flow features in the feature library, the action category of the to-be-processed picture is obtained based on similarities between the virtual optical flow feature of the to-be-processed picture and all the optical flow features in the feature library. In this way, accuracy of the first type of confidence can be improved, to further improve an effect of performing action recognition on the to-be-processed picture.

When the Y optical flow features are some optical flow features in the feature library, a calculation amount of determining the first type of confidence can be reduced, to further improve a speed of performing action recognition on the to-be-processed picture.

105. Determine an action category of the to-be-processed picture based on the first type of confidence.

In this application, the virtual optical flow feature of the to-be-processed picture can be obtained using the spatial feature of the to-be-processed picture and the spatial feature and the optical flow feature in the preset feature library, to simulate, for the picture, time sequence information closely related to an action. Then, action recognition may be performed on the to-be-processed picture based on a similarity between the virtual optical flow feature of the to-be-processed picture and the optical flow feature in the preset feature library.

Further, in this application, action recognition is directly performed by comparing the virtual optical flow feature of the to-be-processed picture with the optical flow feature in the feature library, without establishing a training model to perform action recognition on the to-be-processed picture. Therefore, action recognition on the to-be-processed picture can be implemented using a relatively small quantity of optical flow features.

Optionally, the spatial features in the feature library include a spatial feature of a training video, and the optical flow features in the feature library include an optical flow feature of the training video.

The training video may have a plurality of spatial features, and the training video may also have a plurality of optical flow features.

In this application, the virtual optical flow feature of the to-be-processed picture can be simulated based on the spatial feature and the optical flow feature of the training video, and action recognition may be further performed in combination with the spatial feature and the virtual optical flow feature of the to-be-processed picture, thereby improving action recognition accuracy.

Optionally, the spatial features in the feature library further include a spatial feature of a training picture, and the optical flow features in the feature library further include a virtual optical flow feature of the training picture.

The training picture may have a plurality of spatial features, and the training picture may also have a plurality of optical flow features.

The feature library not only includes the spatial feature and the optical flow feature of the training video, but also includes the spatial feature and the optical flow feature of the training picture. In this case, the virtual optical flow feature of the to-be-processed picture can be determined in combination with the spatial feature and the optical flow feature of the training video and the spatial feature and the optical flow feature of the training picture, thereby further improving final action recognition accuracy.

The virtual optical flow feature of the to-be-processed picture is comprehensively determined using the spatial feature and the optical flow feature of the training video and the spatial feature and the virtual optical flow feature of the training picture such that a more accurate virtual optical flow feature can be obtained.

It should be understood that, when the virtual optical flow feature of the to-be-processed picture is being determined based on the spatial feature and the optical flow feature in the feature library, the virtual optical flow feature of the to-be-processed picture may be determined based on only the spatial feature and the optical flow feature of the training video in the feature library, or the virtual optical flow feature of the to-be-processed picture may be comprehensively determined in combination with the spatial feature and the optical flow feature of the training video in the feature library and the spatial feature and the virtual optical flow feature of the training picture in the feature library.

Optionally, the feature library includes the spatial feature and the optical flow feature of the training video, and determining a virtual optical flow feature of the to-be-processed picture based on the spatial feature of the to-be-processed picture and spatial features and optical flow features in a feature library includes determining, based on a similarity between the spatial feature of the to-be-processed picture and each spatial feature of the training video, a weight coefficient of an optical flow feature corresponding to each spatial feature of the training video, and performing weighted summation on the optical flow feature in the feature library based on the weight coefficient of each optical flow feature of the training video, to obtain the virtual optical flow feature of the to-be-processed picture.

In this application, the virtual optical flow feature of the to-be-processed picture is determined based on only the spatial feature and the optical flow feature of the training video such that complexity of determining the virtual optical flow feature can be reduced.

Optionally, the feature library includes the spatial feature and the optical flow feature of the training video and the spatial feature and the virtual optical flow feature of the training picture, and determining a virtual optical flow feature of the to-be-processed picture based on the spatial feature of the to-be-processed picture and spatial features and optical flow features in a feature library includes determining, based on a similarity between the spatial feature of the to-be-processed picture and each spatial feature of the training video and the training picture, a weight coefficient of an optical flow feature corresponding to each spatial feature of the training video and the training picture, and performing weighted summation on the optical flow feature of the training video and the training picture based on the weight coefficient of each optical flow feature of the training video and the training picture, to obtain the virtual optical flow feature of the to-be-processed picture.

In this application, the virtual optical flow feature of the to-be-processed picture is comprehensively determined using the spatial feature and the optical flow feature of the training video and the spatial feature and the virtual optical flow feature of the training picture such that the obtained virtual optical flow feature of the to-be-processed picture can better reflect motion information of the to-be-processed picture.

Optionally, the virtual optical flow feature of the training picture in the feature library may be obtained based on the spatial feature and the optical flow feature of the training video and the spatial feature of the training picture. In other words, the virtual optical flow feature of the training picture is obtained by performing weighted summation on the optical flow feature of the training video based on a similarity between the spatial feature of the training picture and the spatial feature of the training video.

The virtual optical flow feature of the training picture may be determined before action recognition is performed on the to-be-processed picture.

Optionally, in an embodiment, the method shown in FIG. 1 further includes performing weighted summation on the optical flow feature of the training video based on the similarity between the spatial feature of the training picture and the spatial feature of the training video, to obtain the virtual optical flow feature of the training picture.

Performing weighted summation on the optical flow feature of the training video based on the similarity between the spatial feature of the training picture and the spatial feature of the training video, to obtain the virtual optical flow feature of the training picture includes determining, based on the similarity between the spatial feature of the training picture and each spatial feature of the training video, a weight coefficient of an optical flow feature corresponding to each spatial feature of the training video, and performing weighted summation on the optical flow feature of the training video based on the weight coefficient of each optical flow feature of the training video, to obtain the virtual optical flow feature of the training picture.

In addition to calculating confidence of the to-be-processed picture in the different action categories based on the virtual optical flow feature of the to-be-processed picture, confidence of the to-be-processed picture in the different action categories may be further calculated based on the spatial feature of the to-be-processed picture, and then the action category of the to-be-processed picture is comprehensively determined based on the two types of confidence.

After the spatial feature of the to-be-processed picture is extracted in step 102, a second type of confidence of the to-be-processed picture in the different action categories may be determined based on similarities between the spatial feature of the to-be-processed picture and Z spatial features in the preset feature library. Each of the Z spatial features corresponds to one action category.

Herein, Z is an integer greater than 1, and a value of Z may be the same as or different from a value of X or Y. The Z spatial features may be all or some spatial features in the feature library.

After the second type of confidence is obtained, the action category of the to-be-processed picture may be comprehensively determined based on the first type of confidence and the second type of confidence.

In this application, confidence of the to-be-processed picture is comprehensively obtained through optical flow prediction and spatial prediction such that the action category of the to-be-processed picture can be determined more accurately.

Further, when the action category of the to-be-processed picture is determined based on the first type of confidence and the second type of confidence, weighted summation may be first performed on the first type of confidence and the second type of confidence, to obtain final confidence of the to-be-processed picture in the different action categories, and then the action category of the to-be-processed picture is determined based on the final confidence.

Weighted summation is performed on the first type of confidence and the second type of confidence such that the confidence of the to-be-processed picture in the different action categories can be comprehensively obtained, and the action category of the to-be-processed picture can be better determined.

It should be understood that the action category of the to-be-processed picture may be further determined separately according to the first type of confidence and the second type of confidence, and then the action category of the to-be-processed picture is determined.

Optionally, determining the action category of the to-be-processed picture based on the first type of confidence and the second type of confidence includes determining the action category of the to-be-processed picture as a first action category based on the first type of confidence, determining the action category of the to-be-processed picture as a second action category based on the second type of confidence, and determining the action category of the to-be-processed picture as the first action category when the first action category is the same as the second action category.

To increase quantities of spatial features and optical flow features that are included in the feature library to facilitate better action recognition on the picture subsequently, after the action category of the to-be-processed picture is determined, information such as the spatial feature and the optical flow feature of the to-be-processed picture and the action category of the to-be-processed picture may be further added to the feature library.

Optionally, in an embodiment, after the action category of the to-be-processed picture is determined, the method shown in FIG. 1 further includes adding the spatial feature and the virtual optical flow feature of the to-be-processed picture and action category information in the to-be-processed picture to the feature library.

The spatial feature and the virtual optical flow feature of the to-be-processed picture, and the corresponding action category information are added to the feature library such that the quantities of spatial features and optical flow features that are included in the feature library can be increased, to better perform action recognition on the picture based on the spatial feature and the optical flow feature in the feature library subsequently.

A process of the action recognition method in the embodiments of this application is described below in detail with reference to FIG. 2.

Figure 2:
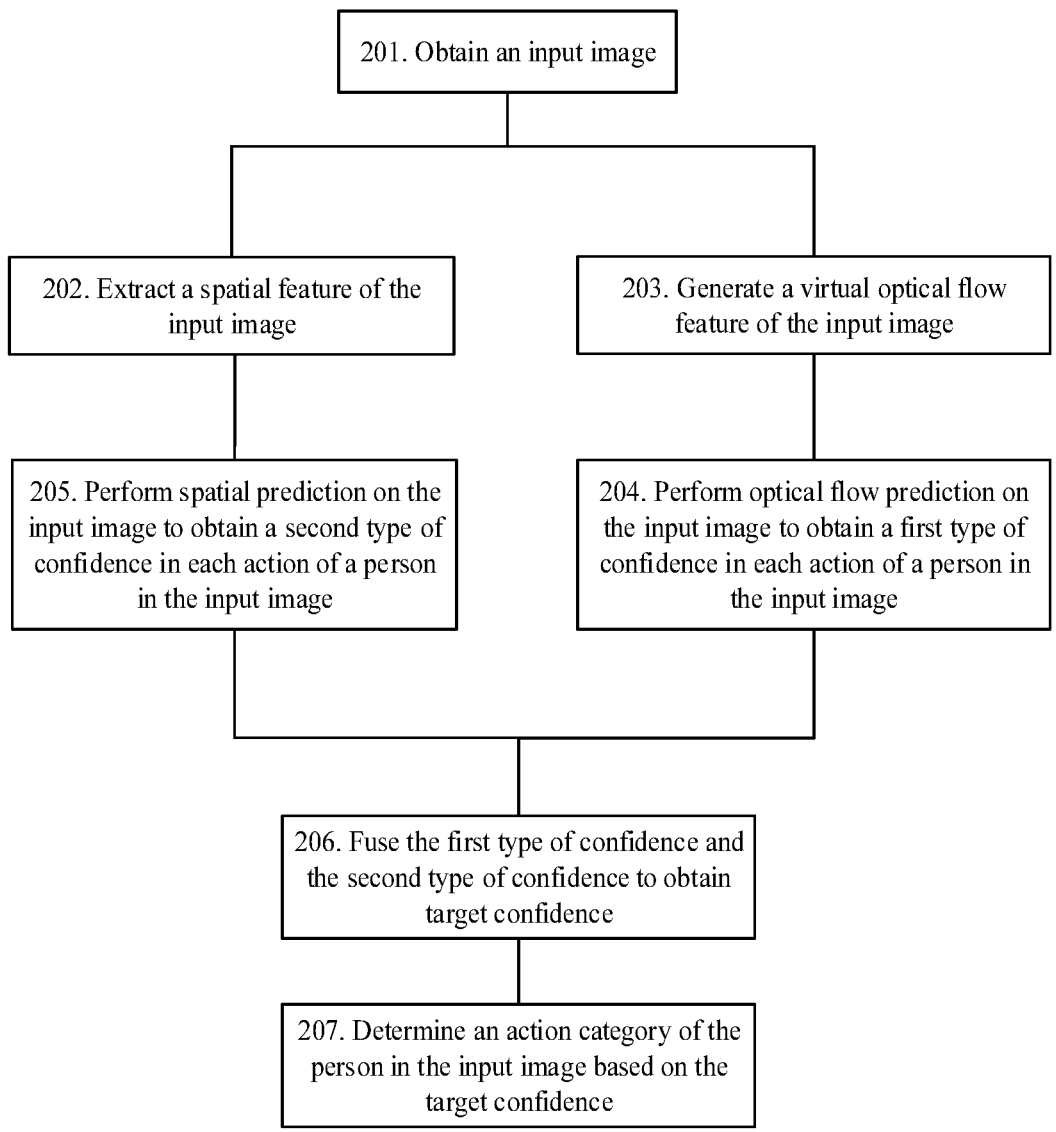
FIG. 2 is a schematic flowchart of an action recognition method according to an embodiment of this application.

FIG. 2 is a schematic diagram of an action recognition method according to an embodiment of this application. A specific process of the action recognition method shown in FIG. 2 includes the following steps.

201. Obtain an input picture.

The input picture is equivalent to the foregoing to-be-processed picture.

202. Extract a spatial feature of the input picture.

Figure 3:
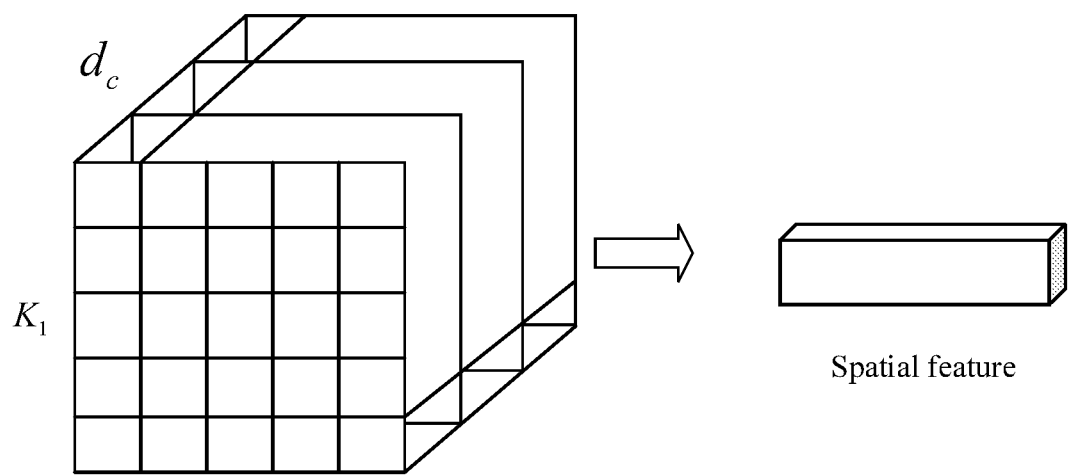
FIG. 3 is a schematic diagram of extracting a spatial feature based on a CNN model.

Further, in step 202, the spatial feature of the input picture may be extracted using a CNN model. As shown in FIG. 3, convolution processing is performed on the input picture using the CNN model, to obtain a convolutional feature map $C_f \in R^{K_1 \times K_2 \times d_c}$ of the input image. Then, $C_f \in R^{K_1 \times K_2 \times d_c}$ is changed to a one-dimensional vector, to obtain a vector $u^{rgb}$. The vector $u^{rgb}$ is the spatial feature of the input picture. The CNN module may be implemented using a plurality of architectures, for example, Visual Geometry Group (VGG) 16 and a temporal segment network (TSN). In addition, a coefficient of the CNN module needs to be obtained through pretraining using an action recognition dataset.

203. Generate a virtual optical flow feature of the input picture.

In step 203, the virtual optical flow feature of the input image may be simulated or generated based on an optical flow feature of a video stored in a video repository.

Further, it is assumed that the video repository stores N videos. In this case, the virtual optical flow feature of the input picture may be generated based on virtual optical flow features of the N videos.

Before generating a virtual optical flow feature of the input picture, spatial features and optical flow features of the N videos need to be obtained first. A spatial feature and an optical flow feature of each of the N videos may be extracted according to a process shown in FIG. 4.

Figure 4:
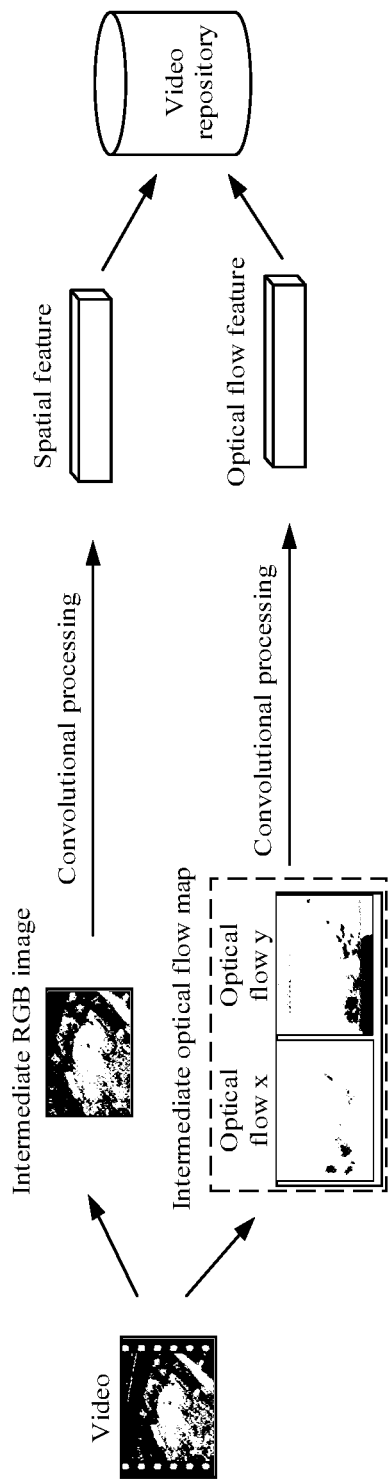
FIG. 4 is a schematic diagram of extracting a spatial feature and an optical flow feature of a video.

As shown in FIG. 4, a specific process of extracting the spatial feature and the optical flow feature of the video includes first extracting a red, green, and blue (RGB) image in the middle of the video and an intermediate optical flow map (the intermediate optical flow map includes an optical flow x and an optical flow y), then putting the RGB image in the middle of the video to a pretrained spatial feature CNN model, to obtain the spatial feature of the video, then putting the optical flow map in the middle of the video to a pretrained optical flow feature CNN model, to obtain the optical flow feature of the video, and finally putting the spatial feature and the optical flow feature of each video to the video repository.

It should be understood that the optical flow map in the middle of the video may be generated using a plurality of frames of pictures before and after a middle moment of the video. In addition, extracting the spatial feature of the video and extracting the optical flow feature of the video may be independent from each other, and may be performed simultaneously or may be performed sequentially.

In the process shown in FIG. 4, the extracted spatial feature and optical flow feature of the video may be a spatial feature vector and an optical flow feature vector. A length of the spatial feature vector and a length of the optical flow feature vector of each video each may be M. In this case, spatial feature vectors of the N videos may be represented using a matrix $V^{rgb} \in N*M$, and optical flow feature vectors of the N videos may be represented using a matrix $V^{flow} \in N*M$. In this way, the spatial feature vectors $V^{rgb} \in N*M$ and the optical flow feature vectors $V^{flow} \in N*M$ of the N videos are obtained.

After the spatial features and the optical flow features of the N videos in the video repository are obtained, weighted summation may be performed on the optical flow features of the N videos based on a similarity between the spatial feature of the input picture and the spatial feature of each of the N videos, to obtain the virtual optical flow feature of the input picture.

Figure 5:
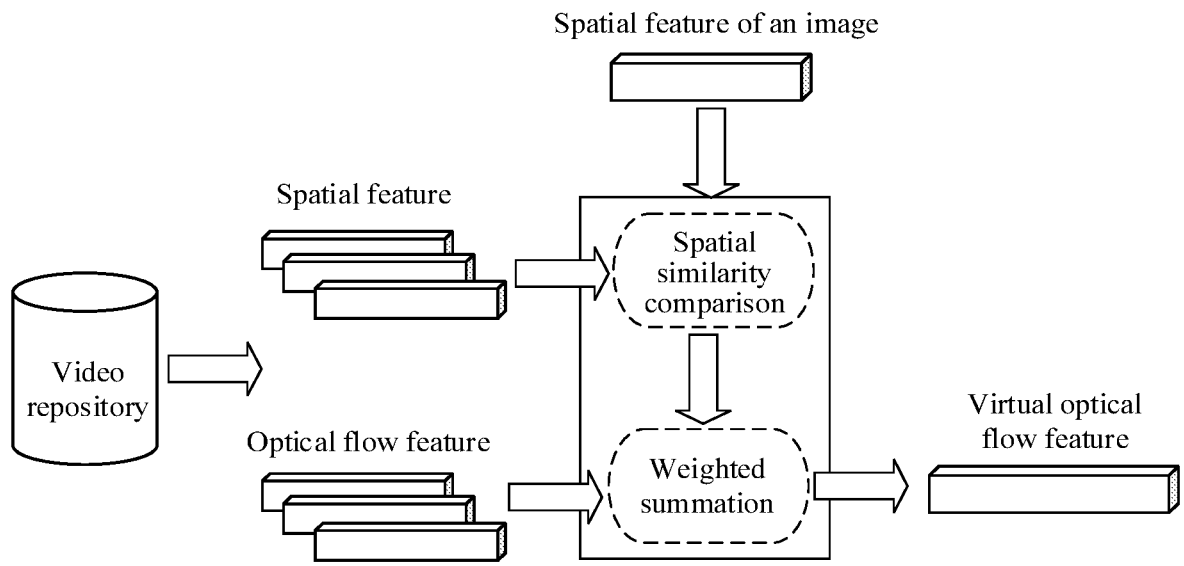
FIG. 5 is a schematic diagram of obtaining a virtual optical flow feature of an input picture.

As shown in FIG. 5, a specific process of performing weighted summation on the optical flow features of the N videos based on a similarity between the spatial feature of the input picture and the spatial feature of each of the N videos, to obtain the virtual optical flow feature of the input picture includes first comparing the spatial feature of the input picture with the spatial feature of the video in the video repository, to obtain the similarity between the spatial feature of the input picture and the spatial feature of each video in the video repository, and then performing weighted summation on the optical flow feature of each in the video repository based on a similarity between the spatial feature of the input picture and the spatial feature of each video in the video repository, to obtain the virtual optical flow feature of the input picture.

Further, the similarity between the spatial feature of the input picture and the spatial feature of the video in the video repository may be calculated using a Gaussian process. For example, the similarity between the spatial feature of the input picture and the spatial feature of the video in the video repository may be determined by using a formula (3):

$$w_h = K_h(u^{rgb}, V^{rgb})[K_h(V^{rgb}, V^{rgb}) + \sigma_h^2 I]^{-1} \in 1*N. \quad (3)$$

Herein, $u^{rgb}$ is the spatial feature of the input picture, $V^{rgb}$ is the spatial feature of the video in the video repository, each element in $K_h(u^{rgb}, V^{rgb}) \in 1*N$ is a dot product of $u^{rgb}$ and $V^{rgb}$ in each row, $K_h(V^{rgb}, V^{rgb})$ is a covariance matrix of $V^{rgb}$, $\sigma_h^2$ is a noise parameter, I is an identity matrix, $w_h$ is the similarity between the spatial feature of the input picture and the spatial feature of the video in the video repository. Herein, $w_h$ is a one-dimensional vector whose length is N, the $i^{th}$ element in $w_h$ represents a similarity between the spatial feature of the input picture and a spatial feature of the $i^{th}$ video, and a larger value of the $i^{th}$ element in $w_h$ indicates a higher similarity between the spatial feature of the input picture and the spatial feature of the $i^{th}$ video.

After the similarity between the spatial feature of the input picture and the spatial feature of each video in the video repository is obtained, the virtual optical flow feature of the input picture may be calculated using a formula (4):

$$u^{flow} = w_h * V^{flow} \in 1*M. \quad (4)$$

Herein, $w_h$ represents the similarity between the spatial feature of the input picture and the spatial feature of the video in the video repository, $V^{flow}$ represents the optical flow feature of the video in the video repository, $u^{flow}$ represents the virtual optical flow feature of the input picture, and $u^{flow}$ is also a feature vector whose length is M.

204. Perform optical flow prediction on the input picture to obtain a first type of confidence of the input picture in each action category of a person.

Figure 6:
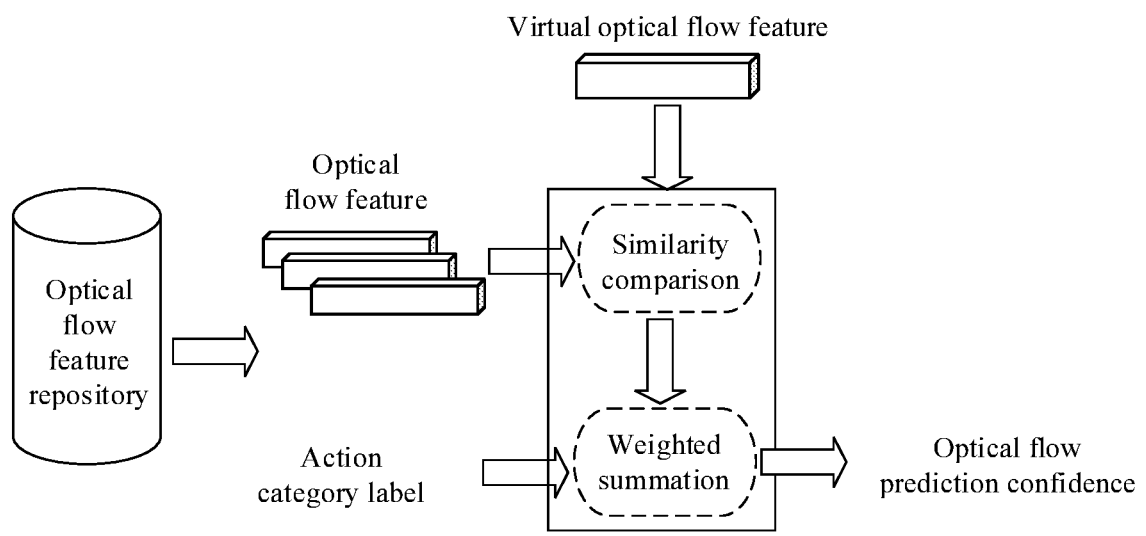
FIG. 6 is a schematic diagram of performing optical flow prediction on an input picture.

As shown in FIG. 6, a specific process of performing optical flow prediction on the input picture to obtain the first type of confidence is as follows first determining a similarity between the virtual optical flow feature of the input picture and an optical flow feature in an optical flow feature library, and then performing, based on the similarity between the virtual optical flow feature of the input picture and the optical flow feature in the optical flow feature library, weighted summation on an action category label corresponding to the optical flow feature in the optical flow feature library, to obtain optical flow prediction confidence (which is equivalent to the first type of confidence in step 204).

The action category label is used to indicate an action category label of each video or picture. The action category label may be represented using a vector. A length of the vector is the same as a total quantity of action types, and each location in the action category label corresponds to one action category. A value at only one location in the vector is 1, and values at the remaining locations are 0. An action category corresponding to a location at which a value is 1 is an action category of the video or picture.

For example, there are three existing videos and three pictures: a video 1, a video 2, a video 3, a picture 1, a picture 2, and a picture 3. Action categories are sequentially running, dancing, running, jumping, dancing, and running.

TABLE 1

|         | Video 1 | Video 2 | Video 3 | Picture 1 | Picture 2 | Picture 3 |
|---------|---------|---------|---------|-----------|-----------|-----------|
| Running | 1       | 0       | 1       | 0         | 0         | 1         |
| Dancing | 0       | 1       | 0       | 0         | 1         | 0         |
| Jumping | 0       | 0       | 0       | 1         | 0         | 0         |

As shown in Table 1, action category labels of the three videos and the three pictures are sequentially [1, 0, 0], [0, 1, 0], [1, 0, 0], [0, 0, 1], [0, 1, 0], and [1, 0, 0]. Then, it may be learned, based on the action category labels, that action categories sequentially corresponding to the three videos and the three pictures are respectively running, dancing, running, jumping, dancing, and running.

The optical flow feature library may include optical flow features of $N_v$ videos and virtual optical flow features of $N_i$ pictures. The optical flow features of the $N_v$ videos are $V_{train}^{flow} \in N_v*M$, the virtual optical flow feature of the $N_i$ pictures are $U_{train}^{flow} \in N_i*M$, and the optical flow features of $N_v$ videos and the virtual optical flow features of $N_i$ pictures jointly form an optical flow feature $$M^{flow} = \begin{bmatrix} V_{train}^{flow} \\ U_{train}^{flow} \end{bmatrix} \in (N_v + N_i) * M$$

in an optical flow feature repository.

The Gaussian process may still be used to calculate the similarity between the virtual optical flow feature of the input picture and the optical flow feature in the optical flow feature library. For example, the similarity between the virtual optical flow feature of the input picture and the optical flow feature in the optical flow feature library may be calculated using a formula (5):

$$w_{flow} = K_P(u^{flow}, M^{flow})[K_p(M^{flow}, M^{flow}) + \Sigma_p]^{-1} \in 1*(N_v + N_i). \quad (5)$$

Herein, $u^{flow}$ represents the virtual optical flow feature of the input picture, $M^{flow}$ represents the optical flow feature in the optical flow feature repository, each element in $K_p(u^{flow}, M^{flow}) \in 1*(N_v+N_i)$ is a dot product of $u^{flow}$ and $M^{flow}$ in each row, $K_p(M^{flow}, M^{flow})$ is a covariance matrix of $M^{flow}$, $$\sum_p = \begin{bmatrix} \sigma_v^2 I & 0 \\ 0 & \sigma_i^2 I \end{bmatrix}$$

is a noise parameter matrix, $w_{flow}$ represents the similarity between the virtual optical flow feature of the input picture and the optical flow feature in the optical flow feature library, and $w_{flow}$ is a one-dimensional vector whose length is $N_v+N_i$. Herein, the $i^{th}$ element represents a similarity between the virtual optical flow feature of the input picture and the $i^{th}$ optical flow feature, and a larger value of the $i^{th}$ element indicates that the optical flow feature of the input picture is closer to the $i^{th}$ optical flow feature.

After the similarity between the virtual optical flow feature of the input picture and the optical flow feature in the optical flow feature library is obtained, the first type of confidence of the input picture in each action category may be calculated according to a formula (6):

$$L_{flow} = (w_{flow} L) \in 1*P. \quad (6)$$

Each row in $L \in (N_v+N_i)*P$ indicates an action category label corresponding to each optical flow feature in the optical flow repository, P is a total quantity of action categories, and for each action category label, the value is 1 only on the category to which it belongs and 0 for the rest of the label. $L_{flow}$ is the first type of confidence of the input picture in each action category of the person.

A process of calculating the first type of confidence of the input picture in each action category of the person is described below with reference to Table 2. For example, the optical flow feature repository includes three videos and three pictures: a video 1, a video 2, a video 3, a picture 1, a picture 2, and a picture 3. Action categories are sequentially running, dancing, running, jumping, dancing, and running. Action category labels respectively corresponding to the three videos and the three pictures are shown in the second column to the seventh column (not including the last row) in Table 2, similarities between the optical flow feature of the input picture and optical flow features of the three video/pictures in the optical flow feature library are shown in the last row in Table 2, and the finally obtained first type of confidence of the input picture in each action category is shown in the last column in Table 2.

TABLE 2

|         | Video 1 | Video 2 | Video 3 | Picture 1 | Picture 2 | Picture 3 | Confidence |
|---------|---------|---------|---------|-----------|-----------|-----------|------------|
| Running | 1       | 0       | 1       | 0         | 0         | 1         | 03         |
| Dancing | 0       | 1       | 0       | 0         | 1         | 0         | 045        |
| Jumping | 0       | 0       | 0       | 1         | 0         | 0         | 025        |
|         | 01      | 02      | 001     | 025       | 025       | 019       |            |

205. Perform spatial prediction on the input picture to obtain a second type of confidence of the input picture in each action of a person.

A process of performing spatial prediction on the input picture is basically the same as the process of performing optical flow prediction on the input picture. A similarity $w_{rgb}$ between the spatial feature $u^{rgb}$ of the input picture and a spatial feature $M^{rgb}$ in a spatial feature library is first obtained through comparison, then confidence $L_{rgb}$ in each category in space is obtained by weighting $w_{rgb}$ and the action category, and the second type of confidence of the input picture in each action category of the person is finally obtained.

The optical flow feature library and the spatial feature library used in step 204 and step 205 may be pre-established feature libraries.

Figure 7:
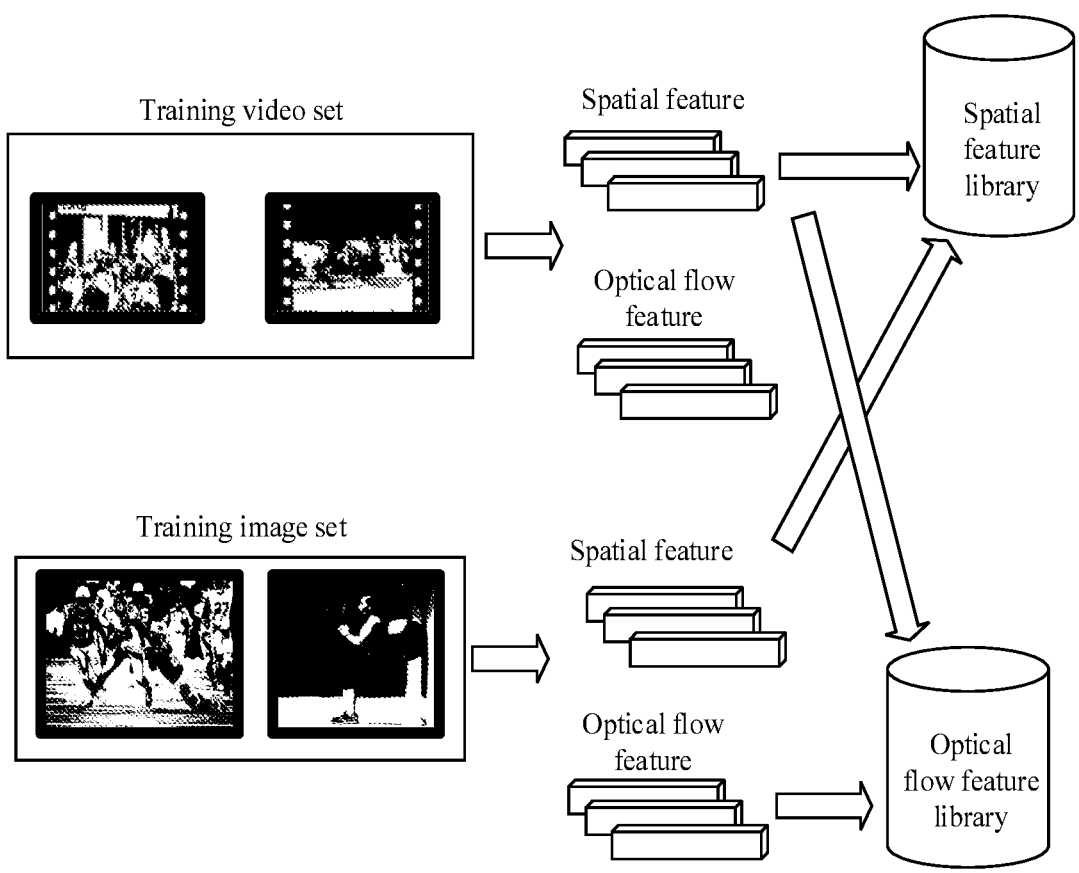
FIG. 7 is a schematic diagram of establishing an optical flow feature library and a spatial feature library.

The optical flow feature library (or the optical flow feature repository) and the spatial feature library (or the spatial feature repository) may be established using a process shown in FIG. 7.

As shown in FIG. 7, a spatial feature and an optical flow feature are extracted from a training video set and a training picture set, the extracted spatial feature of the training video set and the extracted spatial feature of the training picture set are stored in the spatial feature library, and the extracted optical flow feature of the training video set and the extracted optical flow feature of the training picture set are stored in the optical flow feature library.

It is assumed that a finally obtained spatial feature library includes spatial features of $N_v$ training videos and spatial features of $N_i$ pictures, and a finally obtained optical flow feature library includes optical flow features of the $N_v$ training videos and virtual optical flow features of the $N_i$ pictures. In this case, the spatial feature in the spatial feature library may be represented as $$M^{rgb} = \begin{bmatrix} V_{train}^{rgb} \\ U_{train}^{rgb} \end{bmatrix} \in (N_v + N_i) * M,$$

and the optical flow feature in the optical flow feature library $$M^{flow} = \begin{bmatrix} V_{train}^{flow} \\ U_{train}^{flow} \end{bmatrix} \in (N_v + N_i) * M.$$

may be represented as

In addition, the foregoing video training set and the picture training set may be a video set and a picture set that are stored in a local database.

206. Fuse the first type of confidence and the second type of confidence to obtain target confidence.

The first type of confidence and the second type of confidence are fused using proportional fusion without limitation, to obtain the target confidence of the input picture in each action category (that is, final confidence of the input picture in each action category).

207. Determine an action category of the person in the input picture based on the target confidence.

It should be understood that the target confidence includes confidence of the input picture in each action type. Therefore, when the action category of the person in the input picture is determined based on the target confidence, an action category corresponding to maximum confidence in the target confidence may be determined as the action category of the person in the input picture.

Further, when the action category of the person in the input picture is determined based on the target confidence, confidence greater than a preset threshold may be first selected from the target confidence, then the maximum confidence is selected from the confidence, and the action category corresponding to the maximum confidence is determined as the action category of the person in the input picture.

When there is no confidence greater than the preset threshold in the target confidence, it indicates that an accurate action category of the input picture cannot be recognized when action recognition is performed.

It should be understood that, before step 201 to step 207, a video that is relatively highly related to the training picture may be first selected from a local video library and then is placed in the video repository.

It is assumed that videos in an existing video library correspond to $P_v$ action categories in total, and different action categories correspond to different quantities of videos. To avoid an imbalance of action categories, a same quantity (for example, K, where K is an integer greater than 0) of candidate videos need to be selected from each action category to form $P_v$ video packets (that is, video bag). There are K candidate videos in each video packet. There are totally $P_i$ action categories in existing training picture set, and these action categories are not exactly the same as the action categories of the videos.

Therefore, a specific process of selecting, based on the training picture, the video that is relatively highly related to the training picture is as follows.

(1) Extract a spatial feature and an optical flow feature of a video in each video packet in the video library.

(2) Extract spatial features of all training pictures in the training picture set, and determine a virtual optical flow feature of each training picture based on the spatial feature and the optical flow feature of the video in each video packet in the video library.

(3) Establish a local picture spatial feature library and a local picture optical flow feature library based on the spatial feature and the virtual optical flow feature of the training picture.

(4) Perform similarity comparison on a spatial feature and an optical flow feature of each video in the video packet with a picture spatial feature library and a picture optical flow feature library respectively, to finally obtain confidence of each video in the video packet in different action categories, and then use a largest value of the confidence as a similarity measurement between each video and the training picture.

(5) In each video packet, select first J (J<K and both J and K are integers greater than 0) videos with a largest similarity measurement as videos finally saved to the database.

In comparison with the video, an action in the picture lacks a time context relationship, and it is relatively difficult to perform action recognition. This application provides an action recognition method based on the virtual optical flow and the feature library. An optical flow feature closely related to an action is generated for a single picture such that action recognition is performed in combination with a spatial feature and an action feature of the picture, thereby improving action recognition accuracy.

In addition, in this application, the feature library is established using the spatial feature and the (virtual) optical flow feature of the training video and the training picture, and the action category is obtained by comparing the feature library with the spatial feature and the virtual optical flow feature of the input picture such that when the training data is relatively sparse, relatively high action recognition accuracy is achieved.

For comparison with performance of an existing action recognition method, a recognition effect of the action recognition method in this embodiment of this application is described below with reference to Table 3. Table 3 shows recognition accuracy of the action recognition method in this embodiment of this application and the existing action recognition method for different action recognition datasets. To highlight a case in which this application is applicable to sparse training pictures, in the training set shown in Table 2, only one picture is used as a training set of each type of training picture.

TABLE 3

| Action recognition method | WEB 101 dataset | Visual object classes (VOC) dataset | DIFF 20 dataset |
| --- | --- | --- | --- |
| K-nearest neighbors (KNN) algorithm | 26.1 | 38.3 | 55.7 |
| Support-vector machine (SVM) algorithm | 22.3 | 32.0 | 54.2 |
| TSN algorithm | 26.1 | 40.3 | 56.3 |
| Region-CNN (RCNN) | n/a | 28.3 | n/a |

TABLE 3-continued

| Action recognition method | WEB 101 dataset | Visual object classes (VOC) dataset | DIFF 20 dataset |
|---|---|---|---|
| algorithm | | | |
| This application | 35.4 | 42.2 | 60.2 |

It can be learned from Table 3 that for different data sets, recognition accuracy of the action recognition method in this application is higher than recognition accuracy of another existing solution. Therefore, the action recognition method in this embodiment of this application has relatively high recognition accuracy.

The action recognition method in the embodiments of this application is described above in detail with reference to FIG. 1 to FIG. 7. Action recognition apparatuses in the embodiments of this application are described below with reference to FIG. 8 to FIG. 11. It should be understood that the action recognition apparatuses shown in FIG. 8 to FIG. 11 may be devices having a picture processing function, for example, a monitoring device, a terminal device, a network server, or a network cloud platform. The action recognition apparatuses shown in FIG. 8 to FIG. 11 may perform the steps of the action recognition method in the embodiments of this application. For brevity, repeated descriptions are properly omitted below.

Figure 8:
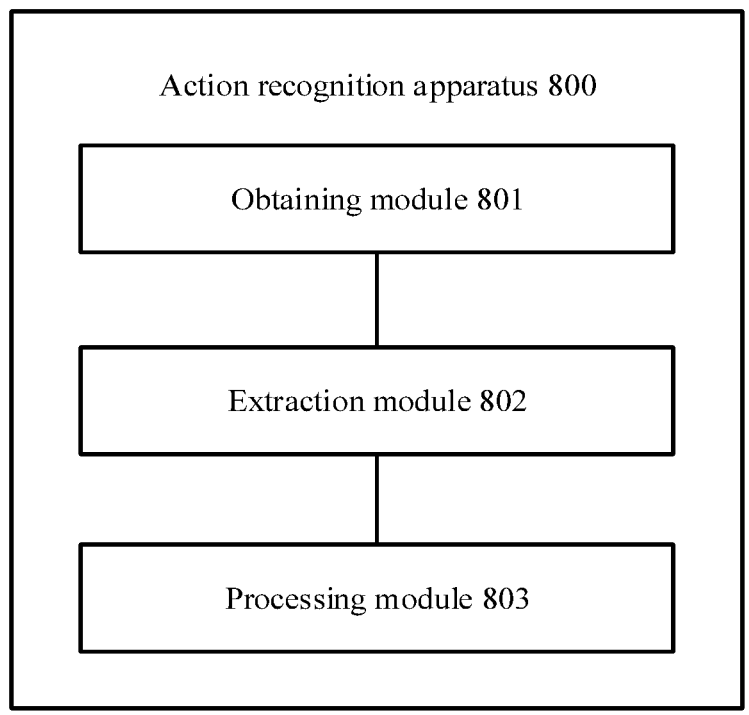
FIG. 8 is a schematic block diagram of an action recognition apparatus according to an embodiment of this application.

FIG. 8 is a schematic block diagram of an action recognition apparatus according to an embodiment of this application. The action recognition apparatus 800 shown in FIG. 8 includes an obtaining module 801 configured to obtain a to-be-processed picture, an extraction module 802 configured to extract a spatial feature of the to-be-processed picture, and a processing module 803 configured to determine a virtual optical flow feature of the to-be-processed picture based on the spatial feature of the to-be-processed picture and X spatial features and X optical flow features in a preset feature library, where there is a one-to-one correspondence between the X spatial features and the X optical flow features, and X is an integer greater than 1.

The processing module 803 is further configured to determine a first type of confidence of the to-be-processed picture in different action categories based on similarities between the virtual optical flow feature of the to-be-processed picture and Y optical flow features in the feature library. Each of the Y optical flow features corresponds to one action category, and Y is an integer greater than 1.

The processing module 803 is further configured to determine an action category of the to-be-processed picture based on the first type of confidence.

In this application, the virtual optical flow feature of the to-be-processed picture can be obtained using the spatial feature of the to-be-processed picture and the spatial feature and the optical flow feature in the feature library, to simulate, for the picture, time sequence information closely related to an action. Then, action recognition may be performed on the to-be-processed picture based on a similarity between the virtual optical flow feature of the to-be-processed picture and the optical flow feature in the feature library.

Figure 9:
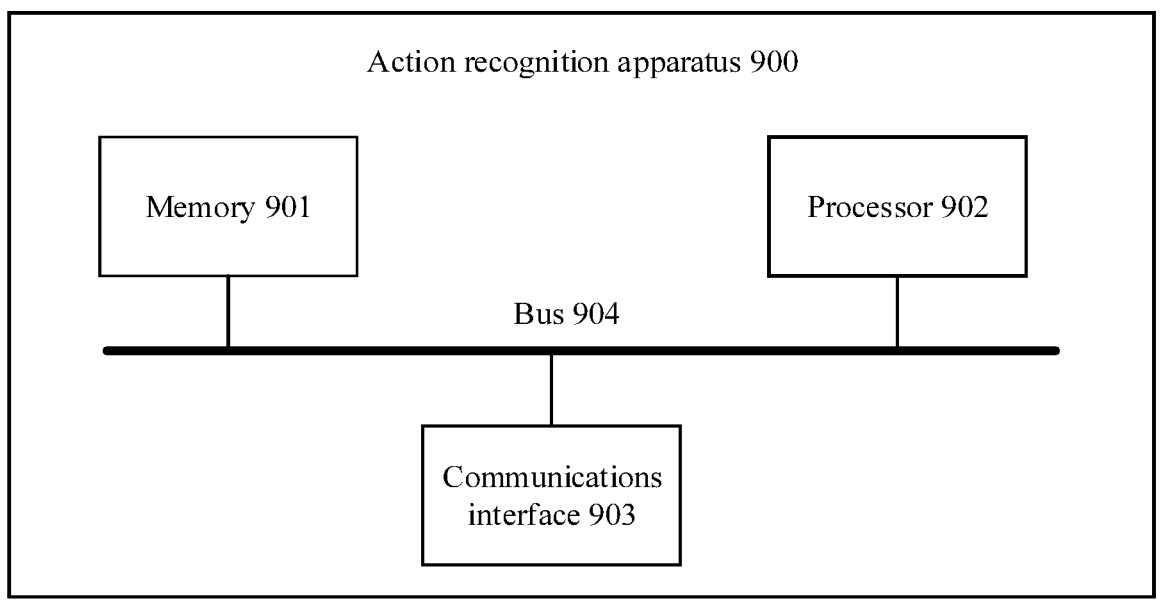
FIG. 9 is a schematic block diagram of an action recognition apparatus according to an embodiment of this application.

FIG. 9 is a schematic diagram of hardware structure of an action recognition apparatus according to an embodiment of this application. An action recognition apparatus 900 (the action recognition apparatus 900 may be a computer device) shown in FIG. 9 includes a memory 901, a processor 902, a communications interface 903, and a bus 904. A communication connection between the memory 901, the processor 902, and the communications interface 903 is implemented using the bus 904.

The memory 901 may be a read-only memory (ROM), a static storage device, a dynamic storage device, or a random-access memory (RAM). The memory 901 may store a program. When the program stored in the memory 901 is executed by the processor 902, the processor 902 and communications interface 903 are configured to perform the steps of the action recognition method in the embodiments of this application.

The processor 902 may be a general-purpose central processing unit (CPU), a microprocessor, an application-specific integrated circuit (ASIC), a graphics processing unit (GPU), or one or more integrated circuits, and is configured to execute a related program in order to implement a function that needs to be performed by a module of the action recognition apparatus in this embodiment of this application, or perform the action recognition method in the method embodiment of this application.

Alternatively, the processor 902 may be an integrated circuit chip, and has a signal processing capability. In an implementation process, the steps of the action recognition method in this application may be implemented using an integrated logic circuit of hardware in the processor 902 or an instruction in a form of software. Alternatively, the processor 902 may be a general purpose processor, a digital signal processor (DSP), an ASIC, a field-programmable gate array (FPGA) or another programmable logic device, a discrete gate or a transistor logic device, or a discrete hardware component. The processor 902 may implement or perform methods, steps, and logical block diagrams that are disclosed in the embodiments of this application. The general purpose processor may be a microprocessor, or the processor may be any conventional processor, or the like. Steps of the method disclosed with reference to the embodiments of this application may be directly performed and completed by a hardware decoding processor, or may be performed and completed using a combination of hardware and software modules in a decoding processor. The software module may be located in a mature storage medium in the art, such as a RAM, a flash memory, a ROM, a programmable ROM (PROM), or an electrically erasable PROM (EEPROM). The storage medium is located in the memory 901. The processor 902 reads information in the memory 901, and completes, in combination with hardware of the processor 902, the function that needs to be performed by the module of the action recognition apparatus in this embodiment of this application, or perform the action recognition method in the method embodiment of this application.

The communications interface 903 uses a transceiver apparatus, for example but not for limitation, a transceiver, to implement communication between the apparatus 900 and another device or communications network. For example, a to-be-processed picture may be obtained using the communications interface 903.

The bus 904 may include a path for transmitting information between the components (for example, the memory 901, the processor 902, and the communications interface 903) of the apparatus 900.

It should be noted that although only the memory 901, the processor 902, and the communications interface 903 are shown in the apparatus 900 shown in FIG. 9, in a specific implementation process, a person skilled in the art should understand that the apparatus 900 further includes other components necessary for implementing a normal operation.

In addition, based on a specific requirement, a person skilled in the art should understand that the apparatus 900 may further include hardware components for implementing other additional functions. In addition, a person skilled in the art should understand that the apparatus 900 may alternatively include only devices required for implementing the embodiments of this application, but does not necessarily include all the devices shown in FIG. 9.

It should be understood that the obtaining module 801 of the action recognition apparatus 800 is equivalent to the communications interface 903 of the action recognition apparatus 900, and the extraction module 802 and the processing module 803 are equivalent to the processor 902.

Figure 10:
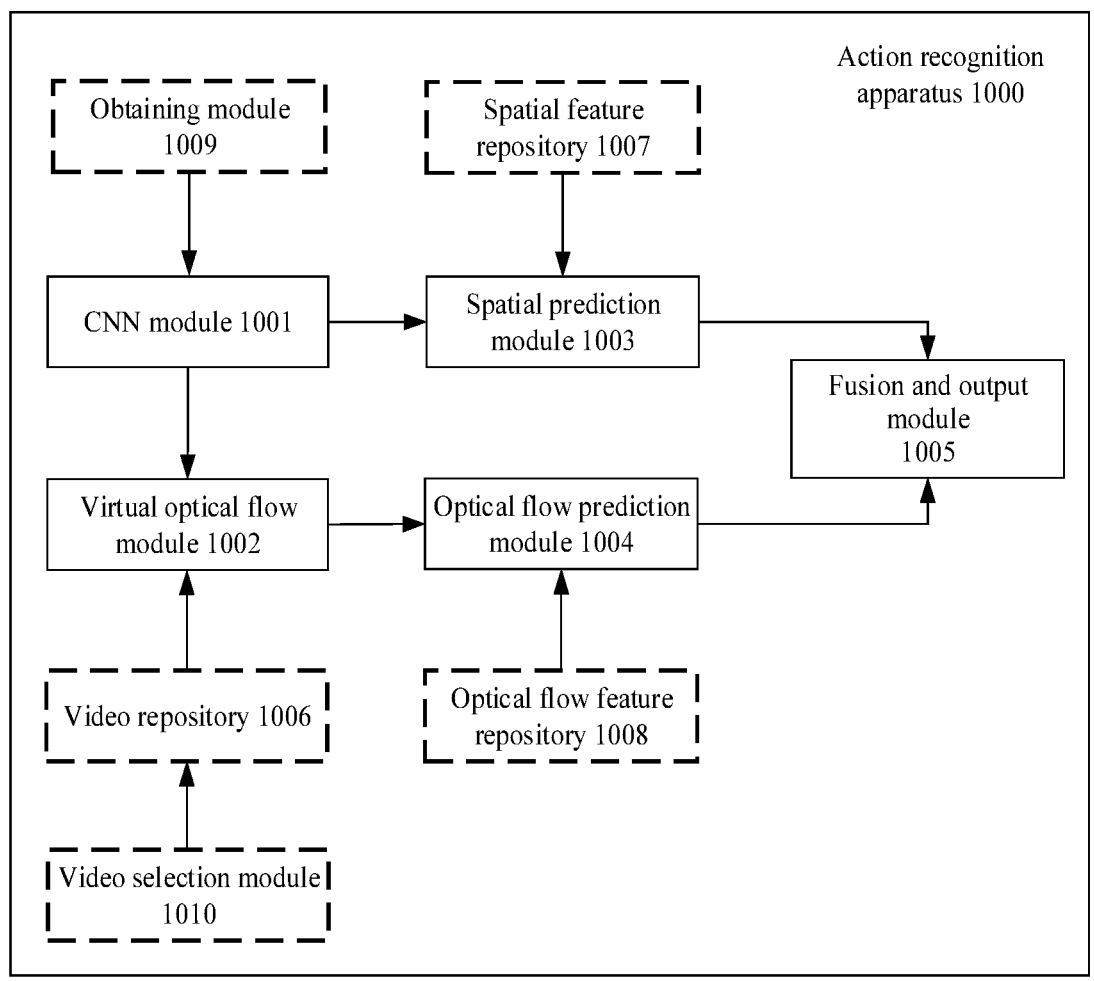
FIG. 10 is a schematic block diagram of an action recognition apparatus according to an embodiment of this application.

FIG. 10 is a schematic block diagram of an action recognition apparatus according to an embodiment of this application. An action recognition apparatus 1000 shown in FIG. 10 includes a CNN module 1001, a virtual optical flow module 1002, a spatial prediction module 1003, an optical flow prediction module 1004, a fusion and output module 1005, a video repository 1006, a spatial feature repository 1007, and an optical flow feature repository 1008.

The video repository 1006, the spatial feature repository 1007, and the optical flow feature repository 1008 may be located inside the action recognition apparatus 1000, or may be located outside the action recognition apparatus 1000. For example, the video repository 1006, the spatial feature repository 1007, and the optical flow feature repository 1008 may be located in a server or a local database, the action recognition apparatus may invoke, from the server or the local database, features included in the video repository 1006, the spatial feature repository 1007, and the optical flow feature repository 1008.

It should be understood that the action recognition apparatus 1000 may perform the steps of the action recognition method in the embodiments of this application. Specific functions of the modules are as follows.

The CNN module 1001 is configured to perform a convolution operation on a to-be-processed picture, to obtain a spatial feature $u^{rgb}$ of the image.

The video repository 1006 is configured to store a spatial feature $V^{rgb}$ and an optical flow feature $V^{flow}$ of a training video.

The virtual optical flow module 1002 is configured to generate a virtual optical flow feature $u^{flow}$ of the to-be-processed picture using the spatial feature $u^{rgb}$ of the to-be-processed picture, and the spatial feature $V^{rgb}$ and the optical flow feature $V^{flow}$ of the training video that are stored in the video repository 1006.

The spatial feature repository 1007 is configured to store spatial features and category labels of the training video and image.

The optical flow feature repository 1008 is configured to store an optical flow feature of the training video, the virtual optical flow feature of the training picture, and action category labels of the training video and the training picture.

The spatial prediction module 1003 is configured to compare the spatial feature of the to-be-processed picture with a feature in the spatial feature repository, to obtain confidence of the to-be-processed picture in each action category.

The optical flow prediction module 1004 is configured to compare the virtual optical flow feature of the to-be-processed picture with a feature in the optical flow feature repository, to obtain confidence of the to-be-processed picture in each category.

The fusion and output module 1005 is configured to fuse confidence that is in each action category of the to-be-processed picture and that is obtained by the spatial prediction module 1003 and the optical flow prediction module 1004, to obtain final confidence of the to-be-processed picture in each category, and select an action category with maximum confidence for outputting.

Optionally, the action recognition apparatus 1000 shown in FIG. 10 may further include an obtaining module 1009 and a video selection module 1010. The obtaining module 1009 is configured to obtain a to-be-processed picture, and the video selection module 1010 is configured to select a video for the video repository 1006.

It should be understood that the obtaining module 1009 of the action recognition apparatus 1000 is equivalent to the communications interface 903 of the action recognition apparatus 900, and other modules of the action recognition apparatus 1000 are equivalent to the processor 902 of the action recognition apparatus 900.

In specific implementation, the CNN module 1001, the virtual optical flow module 1002, the spatial prediction module 1003, the optical flow prediction module 1004, the fusion and output module 1005, the obtaining module 1009, and the video selection module 1010 of the action recognition apparatus 1000 may be implemented using hardware, software, or a combination of hardware and software.

Figure 11:
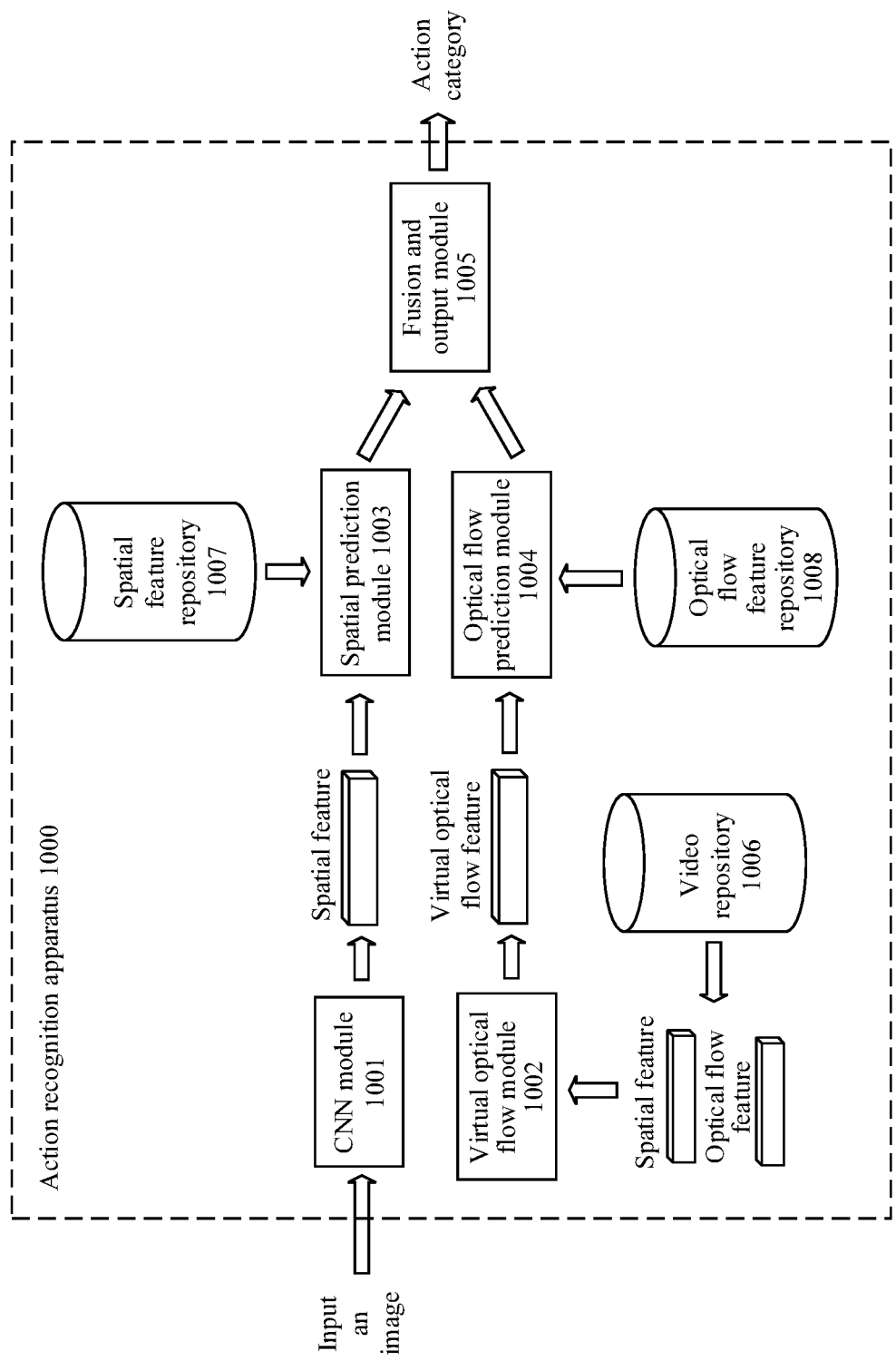
FIG. 11 is a schematic block diagram of action recognition performed by an action recognition apparatus on an input picture according to an embodiment of this application.

To better understand a working procedure of each module of the action recognition apparatus 1000, the following briefly describes an action recognition process of the action recognition apparatus 1000 with reference to FIG. 11 (for a detailed process, refer to each step of the method shown in FIG. 2. Details are not described herein again).

As shown in FIG. 11, a process in which the action recognition apparatus 1000 performs action recognition on an input picture is as follows.

The CNN module 1001 obtains an input picture, and extracts a spatial feature of the input picture.

The virtual optical flow module 1002 determines a virtual optical flow feature of the input picture based on an optical flow feature and a spatial feature in the video repository 1006 and the spatial feature of the input picture.

Next, the optical flow prediction module 1004 performs optical flow prediction based on the extracted virtual optical flow feature of the input picture and an optical flow feature in the optical flow feature repository 1008, to obtain a first type of confidence.

The spatial prediction module 1003 performs spatial prediction based on the extracted spatial feature of the input picture and a spatial feature in the spatial feature repository 1007, to obtain a second type of confidence.

The fusion and output module 1005 fuses the first type of confidence and the second type of confidence to obtain target confidence, and then determines an action category of a person in the input picture based on the target confidence.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on a particular application and a design constraint condition of a technical solution. A person skilled in the art may use different methods to implement the described functions for each particular application, but it should not be considered that the implementation goes beyond the scope of this application.

A person skilled in the art may clearly understand that, for convenience and brevity of description, for specific working processes of the system, apparatus, and unit described above, refer to a corresponding process in the foregoing method embodiment. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, may be located in one position, or may be distributed on a plurality of network units. Some or all of the units may be selected based on an actual requirement to achieve an objective of the solution in the embodiments.

In addition, functional units in the embodiments of this application may be integrated into one processing unit, or the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to other approaches, or some of the technical solutions may be implemented in a form of a software product. The computer software product is stored in a storage medium, and includes several instructions such that one computer device (which may be a personal computer, a server, a network device, or the like) is enabled to perform all or some of the steps of the method in the embodiments of this application. The storage medium includes any medium that can store program code, for example, a Universal Serial Bus (USB) flash drive, a removable hard disk, a ROM, a RAM, a magnetic disk, or a compact disc.

The foregoing descriptions are merely specific implementations of this application, but the protection scope of this application is not limited thereto. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. An action recognition method comprising:
   obtaining a to-be-processed picture;
   extracting a first spatial feature of the to-be-processed picture;
   determining a first virtual optical flow feature of the to-be-processed picture based on the first spatial feature and based on X spatial features and X optical flow features in a preset feature library, wherein the X spatial features and the X optical flow features have a one-to-one correspondence, and wherein X is an integer greater than 1;
   determining a first type of confidence of the to-be-processed picture in different action categories based on first similarities between the first virtual optical flow feature and Y optical flow features in the preset feature library, wherein each of the Y optical flow features corresponds to one action category, and wherein Y is an integer greater than 1; and
   determining an action category of the to-be-processed picture based on the first type of confidence.

2. The action recognition method of claim 1, further comprising:
   determining a weight coefficient of each of the X optical flow features based on a similarity between the first spatial feature and each of the X spatial features; and
   performing a first weighted summation on the X optical flow features based on the weight coefficient of each of the X optical flow features to obtain the first virtual optical flow feature.

3. The action recognition method of claim 2, wherein a value of the weight coefficient of each of the X optical flow features is positively correlated to a first similarity, and wherein the first similarity is between the first spatial feature and a second spatial feature in the X spatial features.

4. The action recognition method of claim 1, wherein the X spatial features comprise a third spatial feature of a training video, and wherein the X optical flow features comprise an optical flow feature of the training video.

5. The action recognition method of claim 4, wherein the X spatial features further comprise a fourth spatial feature of a training picture, and wherein the X optical flow features further comprise a second virtual optical flow feature of the training picture.

6. The action recognition method of claim 5, further comprising performing a second weighted summation on the optical flow feature of the training video based on a similarity between the fourth spatial feature and the third spatial feature to obtain the second virtual optical flow feature.

7. The action recognition method of claim 1, further comprising determining a second type of confidence of the to-be-processed picture in the different action categories based on second similarities between the first spatial feature and Z spatial features in the preset feature library, wherein each of the Z spatial features corresponds to one action category, and wherein Z is an integer greater than 1.

8. The action recognition method of claim 7, further comprising determining the action category of the to-be-processed picture based on the first type of confidence and the second type of confidence.

9. The action recognition method of claim 8, further comprising:
   performing a third weighted summation on the first type of confidence and the second type of confidence to obtain a final confidence of the to-be-processed picture in the different action categories; and
   determining the action category of the to-be-processed picture based on the final confidence.

10. The action recognition method of claim 1, wherein after determining the action category of the to-be-processed picture, the action recognition method further comprises adding the first spatial feature, the first virtual optical flow feature, and action category information in the to-be-processed picture to the preset feature library.

11. An action recognition apparatus comprising:
    a memory configured to store a program; and
    a processor coupled to the memory, wherein the program causes the processor to be configured to:
       obtain a to-be-processed picture;
       extract a first spatial feature of the to-be-processed picture;
       determine a first virtual optical flow feature of the to-be-processed picture based on the first spatial feature and based on X spatial features and X optical flow features in a preset feature library, wherein the X spatial features and the X optical flow features have a one-to-one correspondence, and wherein X is an integer greater than 1;

determine a first type of confidence of the to-be-processed picture in different action categories based on first similarities between the first virtual optical flow feature and Y optical flow features in the preset feature library, wherein each of the Y optical flow features corresponds to one action category, and wherein Y is an integer greater than 1; and determine an action category of the to-be-processed picture based on the first type of confidence.

12. The action recognition apparatus of claim 11, wherein the program further causes the processor to be configured to:
determine a weight coefficient of each of the X optical flow features based on a similarity between the first spatial feature and each of the X spatial features; and
perform a first weighted summation on the X optical flow features based on the weight coefficient of each of the X optical flow features to obtain the first virtual optical flow feature.

13. The action recognition apparatus of claim 12, wherein a value of the weight coefficient of each of the X optical flow features is positively correlated to a first similarity, and wherein the first similarity is between the first spatial feature and a second spatial feature in the X spatial features.

14. The action recognition apparatus of claim 11, wherein the X spatial features comprise a third spatial feature of a training video, and wherein the X optical flow features comprise an optical flow feature of the training video.

15. The action recognition apparatus of claim 14, wherein the X spatial features further comprise a fourth spatial feature of a training picture, and wherein the X optical flow features further comprise a second virtual optical flow feature of the training picture.

16. The action recognition apparatus of claim 15, wherein the program further causes the processor to be configured to perform a second weighted summation on the optical flow feature of the training video based on a similarity between the fourth spatial feature and the third spatial feature to obtain the second virtual optical flow feature.

17. The action recognition apparatus of claim 11, wherein the program further causes the processor to be configured to:
determine a second type of confidence of the to-be-processed picture in the different action categories based on second similarities between the first spatial feature and Z spatial features in the preset feature library, wherein each of the Z spatial features corresponds to one action category, and wherein Z is an integer greater than 1; and
determine the action category of the to-be-processed picture based on the first type of confidence and the second type of confidence.

18. The action recognition apparatus of claim 17, wherein the program further causes the processor to be configured to:
perform a third weighted summation on the first type of confidence and the second type of confidence to obtain a final confidence of the to-be-processed picture in the different action categories; and
determine the action category of the to-be-processed picture based on the final confidence.

19. The action recognition apparatus of claim 11, wherein after determining the action category of the to-be-processed picture, the program further causes the processor to be configured to add the first spatial feature, the first virtual optical flow feature, and action category information in the to-be-processed picture to the preset feature library.

20. A computer program product comprising computer-executable instructions stored on a non-transitory computer-readable medium that, when executed by a processor, cause an apparatus to:
obtain a to-be-processed picture;
extract a first spatial feature of the to-be-processed picture;
determine a first virtual optical flow feature of the to-be-processed picture based on the first spatial feature and based on X spatial features and X optical flow features in a preset feature library, wherein the X spatial features and the X optical flow features have a one-to-one correspondence, and wherein X is an integer greater than 1;
determine a first type of confidence of the to-be-processed picture in different action categories based on first similarities between the first virtual optical flow feature and Y optical flow features in the preset feature library, wherein each of the Y optical flow features corresponds to one action category, and wherein Y is an integer greater than 1; and
determine an action category of the to-be-processed picture based on the first type of confidence.

* * * * *